United States Patent
Corghi (10) Patent No.: US 9,067,467 B2
(45) Date of Patent: Jun. 30, 2015

(54) TYRE REMOVAL TOOL FOR A TYRE REMOVING MACHINE AND A TYRE REMOVING MACHINE

(71) Applicant: CORGHI S.P.A., Correggio (Reggio Emilia) (IT)

(72) Inventor: Giulio Corghi, Correggio (IT)

(73) Assignee: CORGHI S.P.A., Correggio (IT)

( * ) Notice: Subject to any disclaimer, the term of this patent is extended or adjusted under 35 U.S.C. 154(b) by 362 days.

(21) Appl. No.: 13/772,932

(22) Filed: Feb. 21, 2013

(65) Prior Publication Data

US 2013/0269880 A1    Oct. 17, 2013

(30) Foreign Application Priority Data

Apr. 11, 2012    (IT) ................ B02012A0189

(51) Int. Cl.
*B60C 25/05* (2006.01)
(52) U.S. Cl.
CPC ......... *B60C 25/0578* (2013.04); *B60C 25/0506* (2013.04); *B60C 25/0524* (2013.04)
(58) Field of Classification Search
CPC ............ B60C 25/0578; B60C 25/0506; B60C 25/0524; B60C 25/138; B60C 25/0584
See application file for complete search history.

(56) References Cited

U.S. PATENT DOCUMENTS

| | | | |
|---|---|---|---|
| 6,619,362 B2 | 9/2003 | Corghi | |
| 6,823,922 B2 * | 11/2004 | Gonzaga | 157/1.3 |
| 6,880,605 B2 | 4/2005 | Corghi | |
| 7,108,036 B2 | 9/2006 | Spaggiari | |
| 7,128,119 B2 | 10/2006 | Corghi | |
| 7,455,096 B2 * | 11/2008 | Bonacini | 157/1.24 |
| 7,497,761 B2 | 3/2009 | Gozanga | |
| 7,896,054 B2 * | 3/2011 | Bonacini | 157/1.24 |
| 8,291,958 B2 * | 10/2012 | Bartoli | 157/1.24 |
| 8,973,640 B1 * | 3/2015 | Hanneken | 157/1.17 |
| 2002/0017368 A1 | 2/2002 | Corghi | |
| 2004/0055712 A1 | 3/2004 | Corghi | |
| 2004/0182520 A1 | 9/2004 | Spaggiari | |
| 2005/0247409 A1 | 11/2005 | Corghi | |
| 2006/0254725 A1 | 11/2006 | Gonzaga | |
| 2008/0173408 A1 * | 7/2008 | Vignoli | 157/1.24 |

FOREIGN PATENT DOCUMENTS

| | | | |
|---|---|---|---|
| EP | 1177920 A2 | 2/2002 |
| EP | 1398184 A1 | 3/2004 |
| EP | 1459913 A2 | 9/2004 |
| EP | 1593533 A2 | 11/2005 |
| EP | 1714807 A1 | 10/2006 |

* cited by examiner

Primary Examiner — David B Thomas
(74) Attorney, Agent, or Firm — Pearne & Gordon LLP (57) ABSTRACT

A removal tool (10) for a tire removing machine (1), for taking off a tire (7) from a respective wheel rim (6), comprises an elongate body (12) having a first end (12a) which is connectable to a supporting arm (3) and a second, hook-shaped end (12b) for grasping a bead (14) of the tire (7); the second end (12b) of the tool (10) has a fingernail shaped member (13) which is movable from a first operating configuration, where it projects in cantilever fashion from the body (12) to define the hooked shape, to a second operating configuration, where it is tucked in a lateral zone of the body (12), to give the tool (10) a hookless shape, and vice versa.

15 Claims, 8 Drawing Sheets

TYRE REMOVAL TOOL FOR A TYRE REMOVING MACHINE AND A TYRE REMOVING MACHINE

BACKGROUND OF THE INVENTION

The object of this invention is a tyre removal tool for a tyre removing machine and a tyre changing machine equipped with such a tool.

The invention relates to equipment for tyre service specialists and, in particular, to tyre removing machines, that is, machines for removing tyres from wheel rims.

Usually, these tyre removing machines are also used to fit the tyre to the wheel rim.

In light of this, the invention also relates to tyre changing machines for fitting and removing tyres to and from the respective wheel rims.

Whatever the case, for brevity, the term "tyre removing machine" will be used to also denote tyre changing machines which can fit tyres in addition to removing them.

The tyre removing machine comprises a rotary support, also known as "turntable", for the wheel.

The tyre removing machine also comprises a frame to which an arm is movably connected in order to move towards and away from the wheel positioned on the rotary support.

The tyre removing machine further comprises a tyre removal tool connected to a free end of the arm. More specifically, the tool has a first end which is connected to the arm.

The removal tool has the form of a lever and is adapted for insertion between the tyre bead and the edge of the wheel rim to facilitate extraction of the bead from the rim during removal of the tyre from the wheel rim.

It should be noted that even when the tyre is being fitted to the rim, the tool (which for convenience will nevertheless be referred to as "removal tool") is inserted between the tyre bead and the edge of the wheel rim to facilitate insertion of the bead into the rim.

More specifically, the procedure commonly followed to remove a tyre from a respective wheel rim is as follows.

First of all, the tool is positioned near the tyre bead. The tool is then inserted between the edge of the wheel rim and the tyre bead by moving the tool towards the wheel rim. This movement preferably occurs in a direction parallel to the axis of the wheel rim, which corresponds to the axis of the wheel.

At that position, the tool is moved in such a way that a second end of it grasps a portion of the bead.

Next, the tyre bead is extracted from the wheel rim by moving the tool away from the wheel rim. This movement preferably occurs along a direction parallel to the axis of the wheel rim itself.

Preferably, once the bead has passed the edge of the wheel rim, the bead is moved towards the axis of the wheel rim. This reduces the mechanical stress applied to the bead during the subsequent stages.

Next, the wheel rim is set in rotation about its axis while keeping the bead out of the wheel rim.

When removing the tyre from the wheel rim (and more generally speaking, when fitting and removing it), the following are the three requirements to be met:

i) simplifying the operator's work by reducing the effort required of, and the direct action to be taken by, the operator;

ii) limiting the risk of damaging the tyre;

iii) avoiding damage to the wheel rim.

As regards the risk of damaging the tyre, the need to reduce the mechanical stress applied to the tyre bead when the bead is held in the extracted position has been known for some time.

In light of this, several technical solutions have been developed where the above mentioned operations have been substantially automated with the aid of user-operated actuators.

Patent document EP1177920 in the name of the same Applicant as this invention describes an automatic tyre removing machine where the tool is pivoted to the arm in such a way that it can oscillate between two or more operating positions.

In particular, when the tool is inserted between the edge of the wheel rim and the tyre bead, the removal tool is oriented in a first operating position relative to the arm. When the bead is extracted from the rim, on the other hand, the removal tool is oriented in a second operating position relative to the arm (rotated relative to the first operating position).

The rotation of the tool relative to the arm (from the first operating position to the second and vice versa) is carried out by an actuator, which the user must operate at the right moment and which is designed to reduce the mechanical stress the tyre bead is subjected to when it is in the extracted position.

Further, also according to the teachings of EP1177920, the second end of the removal tool (that is, the free end) is hook shaped. This allows the tool to grasp the tyre bead when the tool is inserted between the bead and wheel rim.

This solution has three disadvantages, however.

A first disadvantage is due to the fact that inserting the hook-shaped tool between the edge of the wheel rim and the tyre bead creates the risk of damage, at least to the bead.

A second disadvantage is that the machine is complex and although it allows the user to save physical effort, it nevertheless requires a great deal of care and skill of the user to control riot only the movement of the arm (and of the tool connected thereto) but also the movement of the tool relative to the arm.

A third disadvantage is the complexity and high cost of the tool drive system, which is made up of several different parts.

Patent document EP1593533, in the name of the same Applicant as this invention, is an example of an improvement to the technical solution provided by patent document EP1177920. In effect, EP1593533 proposes a technical solution where the tool is connected to the arm by a kinematic mechanism (more specifically, a four-bar linkage) which guides its movement according to a predetermined path.

This simplifies the user's task since there is no need for combined operation of the actuator which moves the arm (and the tool connected thereto) and the actuator which moves the tool relative to the arm, and all the user has to do is to operate an actuator which drives the tool through the agency of the kinematic mechanism, thereby obtaining a tool movement along a trajectory which reduces the mechanical stress applied to the bead when the bead is being extracted and when it is in the extracted position (during the subsequent step of rotating the wheel rim).

Nevertheless, patent EP1593533 still has the disadvantage of creating a significant risk of damaging the tyre bead (and even the edge of the wheel rim) when the hook-shaped tool is inserted between the rim edge and the bead.

Another example of a tyre removing machine is described in patent document EP1714807B1, which proposes a technical solution which is a variation on the use of a four-bar linkage for connecting the tool to the arm.

In a first embodiment, the tool (which is still an elongate element having a hook-shaped end) is hinged to a lever which is in turn hinged to the arm.

In this case, tool movement during the steps of insertion and extraction is controlled by turning this lever.

In a second embodiment proposed by patent EP1714807B1, the tool is pivoted to a slot formed on the arm so as to be able to roto-translate relative to it.

Nevertheless, even patent EP1714807B1 has the disadvantage of creating a significant risk of causing damage to the tyre bead and certainly also to the edge of the wheel rim (which the tool has to rest on) when the hook-shaped tool is inserted between the rim edge and the bead.

Patent document EP1459913 discloses a device for mounting and demounting tyre which has the drawbacks mentioned above.

SUMMARY OF THE INVENTION

This invention has for an aim to provide a tyre removal tool for a tyre removing machine and a tyre removing machine that overcome the above mentioned disadvantages of the prior art.

More specifically, it is an aim of this invention to provide a tyre removal tool for a tyre removing machine and a tyre removing machine that reduce the risk of damaging the tyre and the wheel rim without adversely affecting the simplicity of the machine and its ease of use.

A further aim of the invention is to provide a tyre removal tool for a tyre removing machine and a tyre removing machine that are functionally effective and at once simple in construction and inexpensive.

A yet further aim of the invention is to provide a tyre removing machine that is particularly simple in construction as well as easy to use.

These aims are fully achieved by the tyre removal tool and the tyre removing machine according to the invention as characterized in the appended claims.

More specifically, the invention relates to a tyre removing machine comprising:
- a rotary support for the wheel, whereby the wheel can be fixed to the rotary support;
- an arm which is movably connected to a frame (at a first end of the arm itself);
- a removal tool connected to the arm (at a second end of the arm itself).

The tool has a first and a second end. The first end is connectable to the arm. The second end is a free end for interacting with the tyre.

More specifically, the invention relates to the removal tool for extracting the tyre from the corresponding wheel rim.

The tool comprises an elongate body having a first end which is connectable to the arm (which supports the removal tool itself) and a second free end. The first and second ends of the body correspond to the first and second ends of the tool.

According to the invention, the second end of the tool has a fingernail (i.e. a member which is shaped substantially as a fingernail, i.e. as a lug) which is movable between a first operating configuration, where it projects in cantilever fashion from the tool body to define a hooked shape, and a second operating configuration, where it is tucked in a lateral zone of the tool body, to give the tool a hookless shape (that is to say, a substantially tapered, or wedge-like, shape designed to facilitate, or at least not to hinder, the insertion of the tool between the tyre bead and the edge of the wheel rim).

This advantageously makes it possible to reduce significantly the risk of damaging the tyre and the wheel rim when the tool is inserted between the tool and the edge of the rim, without reducing the efficacy of the removal tool in seizing (or grasping) the bead.

Quite the contrary, the fact that the second end of the tool can be deformed from the second operating configuration, where it is tapered, to the first operating configuration, where it is hook shaped, and vice versa, makes it advantageously possible to increase the size of the portion (fingernail shaped member) positioned in cantilever fashion to form the hook shape (without the risk of damaging the tyre or the wheel rim), thus further increasing the efficacy of the tool in grasping the tyre bead.

It should be noted that the removal tool is configured in such a way that when it is in the first operating configuration, the body and the fingernail shaped member form a seat, that is, a bracket (which forms the hooked shape) designed to support and retain a portion of the tyre bead abutting the surface (substantially L-shaped) joining the fingernail shaped member to the tool body).

It should be noted that the removal tool is preferably designed to also fit the tyre to the wheel rim.

It should be noted that the scope of this invention is not limited by the orientation of the axis of rotation of the machine's rotary support, which may be vertical relative to a supporting surface of the tyre removing machine itself (the solution typical of machines designed to remove tyres from relatively small wheels) or horizontal (the solution typical of machines designed to remove tyres from large-sized wheels), or which may have any other orientation.

It should be noted that the body of the removal tool preferably has the form of a shaped rod.

Preferably, in the second operating configuration, the fingernail shaped member is placed against the tool body.

For example, in the second operating configuration, the fingernail shaped member is folded onto the tool body; or the fingernail shaped member is withdrawn into the tool body.

Alternatively, in the second operating configuration, the fingernail shaped member might also be positioned in such a way as to form an extension of the second end of the tool body.

The removal tool preferably also comprises movement means for moving the fingernail shaped member from the first operating configuration to the second and/or vice versa.

It should be noted that at least a part of the movement means can be associated with the tyre removing machine (that is, that they are not necessarily mounted on the tool or connected to the body of the removal tool).

Generally speaking, the tyre removing machine according to the invention comprises movement means for moving the fingernail shaped member from the first operating configuration to the second and/or vice versa.

The movement means can be embodied in several different ways according to the invention: in particular, the movement means may be completely passive, partly passive and partly active, or completely active. If the movement means are active, they may comprise a single-acting or a double-acting actuator.

For example, the movement means might comprise an elastic element (for example, a spring) operating on the fingernail shaped member to force it into the first operating configuration or into the second operating configuration when there are no external forces applied to the fingernail shaped member.

If the elastic element operates on the fingernail shaped member to force it into the first operating configuration (where the tool is hook shaped), the movement of the fingernail shaped member from the first operating configuration to the second occurs by interaction of the fingernail shaped member with the tyre when the tool is inserted (between the tyre and the wheel rim).

Thus, in that case, when the second end of the tool is fully inserted between the tyre bead and the wheel rim (and is therefore no longer in contact with the tyre), the fingernail shaped member automatically returns to the first operating configuration under the action of the elastic element. Therefore, in the subsequent extraction step, the tool is hook shaped.

If the elastic element operates on the fingernail shaped member to force it into the second operating configuration (where the tool is tapered), the movement of the fingernail shaped member from the second operating configuration to the first occurs by interaction of the fingernail shaped member with the tyre when the tool is extracted, that is to say, when the tyre bead is grasped by the tool.

In that case, the tool is preferably shaped in such a way that, in the second operating configuration, the supporting surface of the fingernail shaped member, projecting from the tool body, faces in the opposite direction to the direction of tool insertion (that is, it faces the side opposite the free end of the tool itself). In this case, in the second operating configuration, the tool is wedge shaped.

Thus, when the second end of the tool is positioned completely between one of the two tyre beads and the wheel rim arid is moved away from the other tyre bead, the fingernail shaped member returns automatically to the first operating configuration since the supporting surface comes into contact with the tyre bead, which forces it to move (open) against the action of the elastic element.

In the above mentioned examples, the movement means are passive since they comprise, preferably, only the spring (that is, the elastic element).

The adjective "passive" referred to the movement means indicates that the movement means operate automatically in response to the external stresses applied to the fingernail shaped member arid do not need to be activated (or rather they cannot be activated) directly by the user with a remote control.

Alternatively (or in addition), the movement means might comprise an actuator able to be remotely operated b the user, for example a pneumatic actuator.

In this case, the movement means are at least partly active.

If the actuator is a single-acting one (for example a single-acting pneumatic actuator), it is operatively connected to the fingernail shaped member to move it into the first operating configuration or into the second operating configuration.

If the actuator is a single-acting one, it preferably acts in conjunction with an elastic element (for example like the one described in the above examples).

Alternatively, the actuator might be a double-acting one (for example, a double-acting pneumatic actuator. In this case, the movement means are completely active.

It should be noted that "single-acting actuator" means an actuator which defines only one stable position (of a control element, such as a piston for example) whereas "double-acting actuator" means an actuator which defines two stable positions (of a control element, such as a piston for example).

It should be noted that the movement means by which the fingernail shaped member is moved (from the first operating configuration to the second), might comprise a shape memory material. For example, at least part of the fingernail shaped member and at least part of the tool body might be made of a shape memory material (or a smart material).

It should also be noted that the fingernail shaped member might also be movable between more than two stable operating configurations.

Preferably, the fingernail shaped member (that is, the tool portion which is movable to determine a reversible deformation of the tool from a tapered shape to a hook shape and vice versa) is pivoted to the tool body so as to rotate about an axis of rotation.

It should be noted that the tool body, or the end portion of the tool body, is elongate along a longitudinal axis.

In light of this, the fingernail shaped member is preferably pivoted to the tool body so as to rotate about an axis of rotation which is transversal to the longitudinal axis (that is, an axis of rotation included in a plane perpendicular to the longitudinal axis).

Preferably, the fingernail shaped member is pivoted to the tool body at a portion of the tool body proximal to the second end of the tool body (that is, the free end).

That way, the free end of the fingernail shaped member (opposite the end of the fingernail shaped member which is pivoted to the tool body) is proximal to the first end of the tool body, when the fingernail shaped member is in the second operating configuration (where the fingernail shaped member is folded onto the tool body) compared to the end of the fingernail shaped member pivoted to the tool body which is, instead, further away from the tool body when the fingernail shaped member is in the second operating configuration.

In other words, when the fingernail shaped member is in the second operating configuration, the end of it hinged to the tool body and the free end portion of the tool body (that is, the portion of the tool body furthest from the first end which is connected to the arm) are substantially aligned (along the axis of extension of the tool body). In this configuration, the end of the fingernail shaped member which is hinged to the tool body is preferably interposed between the free end of the fingernail shaped member itself and the end portion of the tool body.

This has the advantage of hindering the penetration of dirt in the gap between the fingernail shaped member and the tool body. Another advantage is that it makes the tool particularly suited to be controlled (with reference to the movement from the first operating configuration to the second) by passive movement means (for example an ordinary spring, a magnet or the like) in a totally automatic manner.

Preferably, the body of the removal tool comprises a contact surface against which the fingernail shaped member abuts when it is in the first operating configuration (where the fingernail shaped member projects in cantilever fashion from the tool body).

This contact surface defines a stop, that is, a mechanical constraint, which prevents further movements of the fingernail shaped member away from the first end of the tool. More specifically, the mechanical constraint is configured to prevent further rotation of the fingernail shaped member in an opening direction (the opening direction is that in which the fingernail shaped member rotates when passing from the second operating configuration to the first operating configuration).

This has the advantage of making the tool particularly robust, increasing the ability of the fingernail shaped member to support the mechanical stresses applied during extraction of the tyre bead.

According to another aspect of the invention, attention is drawn to the following.

The removal tool is rotatably connected to the corresponding arm of the tyre removing machine so as to oscillate about an axis of rotation which is transversal to the longitudinal direction of extension of the tool itself.

It should be noted that (when the fingernail shaped member is in the first operating configuration) the tool defines a portion (that is, the fingernail shaped member) which projects in cantilever fashion from the tool body. Thus, this cantilevered projecting portion (that is, the fingernail shaped member) is oriented in a direction which is transversal to the longitudinal direction of extension of the tool (more specifically, of the end portion of the tool body).

In light of this, it should be noted that the axis of rotation of the tool relative to the arm is perpendicular to the longitudinal direction of extension of the tool and to the transversal direction along which the cantilevered projecting portion (that is, the fingernail shaped member) is oriented.

More specifically, the removal tool is articulated to the arm at a single hinge point.

This hinge point is fixed relative to the arm.

Between the second (hook shaped) end of the tool and the hinge point, the tool does not have any other articulations or hinges.

The removal tool is connected to the arm in such a way that it can oscillate between at least a first and a second operating position.

More specifically, the tool (the first end of the tool) is connected to a second end of the arm, whilst a first end of the arm is connected to a frame of the tyre removing machine.

Operating between the removal tool and the arm there are biasing means for forcing the tool to return to the first operating position when there are no external forces applied to the tool.

These biasing means comprise, for example, an elastic element (such as a spring).

This invention therefore provides a removal device comprising:
- an arm which is connectable to a frame of a tyre removing machine;
- a removal tool articulated to the arm.

According to this second aspect of the invention, the removal tool is rotatably connected to the arm at a single hinge point which is fixed relative to the arm, so as to oscillate between a first operating position and a second operating position. The device also comprises elastic means operating on the tool in such a way as to force it to move to the first operating position when there are no external forces applied to the tool.

In light of this, it should be noted that the invention also provides a tyre removing machine comprising the removal device, that is, a tyre removing machine comprising
- a rotary support for the wheel;
- an arm connected to a frame;
- a removal tool articulated to the arm, where the removal tool is rotatably connected to the arm at a single hinge point which is fixed relative to the arm, so as to oscillate between a first operating position and a second operating position; the device comprises elastic means operating on the tool in such a way as to force it to move to the first operating position when there are no external forces applied to the tool.

An advantage of this technical solution is that the tyre removing machine (and in particular the removal device) which it provides is particularly simple in construction and at the same time is able to reduce the mechanical stresses applied to the tyre bead during extraction, thereby simplifying the user's task.

In effect, the tool is inserted between the tyre bead and the wheel ream by simply operating on an actuator (for example, an actuator adapted to move the arm relative to the frame).

The biasing means ensure that the tool is kept in a correct position, without interfering with the edge of the wheel rim and thus without the risk of damaging the wheel rim. The biasing means also ensure that when the tool is inserted between bead and rim, it is positioned correctly relative to the bead and grasps the bead with its hooked end.

When the tool is in the bead extraction position (where the bead portion grasped by the removal tool is distal, that is, away, from the other bead of the tyre) the tension the bead itself is subjected to overcomes the resistance of the biasing means, so that the tool is inclined at an angle and automatically moves to the second operating position.

In the second operating position, the bead is located above the wheel rim but at a position close to the wheel axis so that the mechanical stress it is subjected to is reduced.

The advantage of the technical solution just described lies in that fact that the operations described above (with reference to the movements of the tool and tyre bead) are performed without the intervention of the operator, that is to say, automatically, and by means of a device which is particularly simple in construction.

It should be noted that the second aspect of the invention (regarding the fact that the tool is pivotally mounted relative to the arm, with interposed biasing means) is applicable to a tyre removing machine (or to a removal device) regardless of whether or not the hooked end of the tool is deformable (according to this invention). In other words, the second aspect of the invention is applicable both to a tyre removing machine (or to a removal device) having a removal tool whose second end is deformable (as described above) and to a tyre removing machine (or to a removal device) having a removal tool whose second end is not deformable (as in the example illustrated in FIG. 12).

As regards the operating position of the removal tool, the following should be noted.

Preferably, the first operating position of the tool is such that the tool is operatively oriented according to an axis which is parallel to the axis of the wheel or inclined at an angle towards the inside of the rim (that is, the tool is oriented in such a way that the second end of the tool is closer to the wheel axis than the first end of the selfsame tool).

The second operating position of the tool is such that the tool is operatively oriented according to an axis which is inclined at an angle towards the outside of the rim (that is, the tool is oriented in such a way that the second end of the tool is further from the wheel axis than the first end of the selfsame tool).

It should also be noted that this aspect of the invention is advantageously combined with the main aspect of the invention, and that is, the fact that the second end of the tool is reversibly deformable from the first operating configuration (hooked position) to the second operating configuration (hookless, or tapered, position).

Indeed, combining the movement means of the fingernail shaped member with the tool biasing means makes the removal device (that is, the tyre removing machine) particularly simple in construction arid easy to use, and also minimizes the risks of damaging the tyre and the wheel rim.

Furthermore, this invention also provides a method for removing a tyre from a respective wheel rim.

The method entails the use of a tyre removing machine as described above, and more specifically, a tyre removing machine comprising a rotary support for the wheel, an arm having a first end which is movably connected to a frame, and a removal tool having a first end which is connected (preferably pivoted) to a second end of the arm.

The method comprises the following steps:
- inserting at least a second end of the tool between an edge of the wheel rim and a tyre bead (preferably with the removal tool in a first operating position relative to the arm, by moving the arm towards the rim);
- extracting the tyre bead from the wheel rim (preferably with the removal tool in a second operating position relative to the arm, by moving the arm away from the rim);

rotating the wheel rim about its axis while keeping the arm in a position where the tyre bead is extracted from the wheel rim.

According to the invention, between the step of insertion and the step of extraction, the second end of the tool is deformed from a second operating configuration, where it is tapered, to a first operating configuration, where it is hook shaped.

The expression "second end of the tool" means the portion of the tool which abuts against the portion of the bead which is grasped by the tool during the step of extraction.

Preferably, the deformation of the second end of the tool from the second operating configuration to the first occurs automatically by interaction between the tool and the tyre bead in the step of insertion or in the step of extraction.

It should be noted that the first operating configuration of the tool corresponds to the first operating configuration of the fingernail shaped member and the second operating configuration of the tool corresponds to the second operating configuration of the fingernail shaped member.

Preferably, the tool is kept in the first or in the second operating configuration by elastic means.

Preferably, the movement of the removal tool from the second operating configuration to the first occurs automatically according to an interaction between the second end of the tool and the tyre bead.

More specifically, the movement of the removal tool from the second operating configuration to the first occurs by effect of the force applied to the tool by the tyre bead grasped by the tool itself (in the step of grasping and extraction), or by effect of the tyre bead ceasing to apply force on the tool (this force being applied in a direction of closing the fingernail shaped member against the action of the elastic means) during the step of inserting the tool between the wheel rim and the tyre.

As regards the operating position of the removal tool (relative to the wheel), the following applies.

Preferably, the tool is kept in the first operating position by elastic means.

Preferably, the movement of the removal tool from the first operating position to the second occurs automatically according to an interaction between the second end of the tool and the tyre bead.

More specifically, the movement of the removal tool from the first operating position to the second occurs by effect of the force applied to the tool by the tyre bead towards the axis of the wheel rim.

BRIEF DESCRIPTION OF THE DRAWINGS

These and other features of the invention will become more apparent from the following detailed description of a preferred, non-limiting embodiment of it, with reference to the accompanying drawings, in which.

DESCRIPTION OF THE PREFERRED EMBODIMENTS

The numeral 1 in the drawings denotes a tyre removing machine according to this invention.

Figure 1:
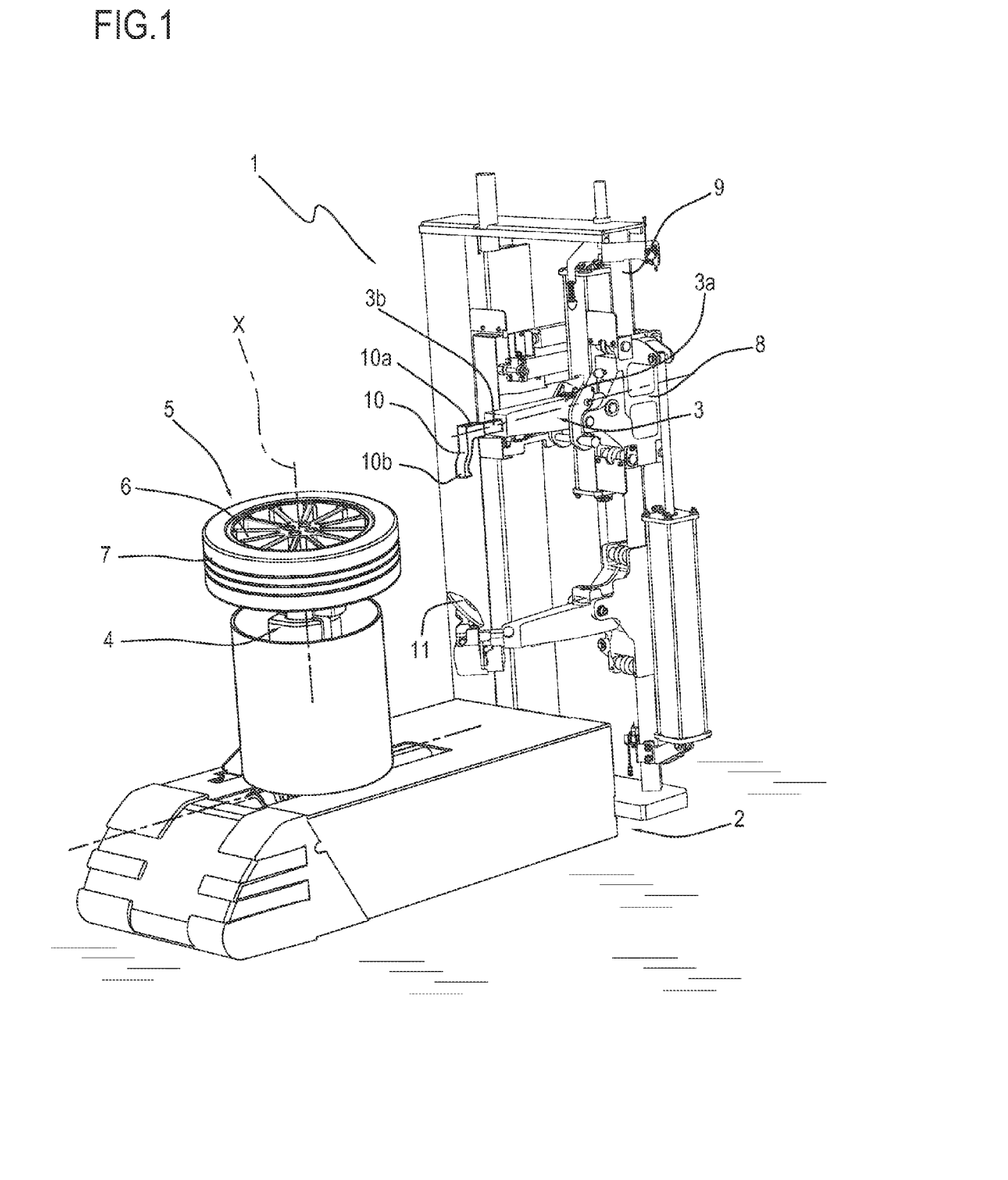
FIG. 1 schematically illustrates a tyre removing machine according to this invention.

The tyre removing machine 1 comprises a frame 2.

The tyre removing machine 1 comprises an arm 3 connected to the frame 2.

The tyre removing machine 1 also comprises a rotary support 4 for a wheel 5.

The rotary support 4 is configured in such a way as to allow the wheel 5 to be locked to the rotary support 4 itself.

The rotary support 4 is connected to a drive motor (not illustrated, of per se known type) to set the wheel 5 in rotation about its axis X.

The wheel 5 comprises a rim 6 and a tyre 7. It should be noted that the axis X of the wheel 5 is also the axis of rotation of the rim 6 of the wheel 5.

In the example illustrated in FIG. 1, the rotary support 4 is configured in such a way as to support the wheel 5 with the axis X vertical (that is, perpendicular to the machine supporting surface, or parallel to the direction of the weight force).

The rotary support 4 might, however, be configured in such a way as to support the wheel 5 with the axis X oriented in any way (for example, horizontal).

The arm 3 is movably coupled to the frame 2.

In the example illustrated, the arm 3 is movably connected to a slider 8 which is slidable relative to a post 9 of the frame 2.

The tyre removing machine 1 also comprises a removal tool 10 connected to the arm 3.

More specifically, the arm 3 has a first end 3a connected to the frame 2 and a second end 3b connected to the removal tool 10.

More specifically, the removal tool 10 has a first end 10a connected to the arm 3 (to the second end 3b of the arm 3) and a second end 10b.

It should be noted that the tyre removing machine 1 might comprise further tools connected to the frame 2, such as, for example, bead breakers 11.

Figure 2:
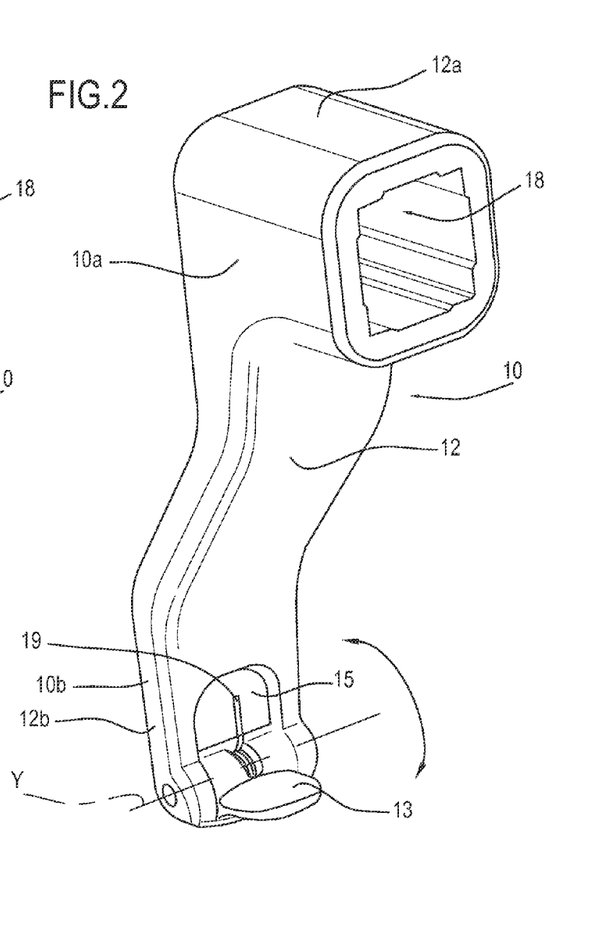
FIG. 2 illustrates a removal tool according to the invention, in a first operating configuration.

The removal tool 10 comprises an elongate body 12.

More specifically, the body 12 is elongate along a longitudinal direction L of principal extension of the body 12.

Also, preferably, the body 12 has a flattened form. More specifically, the body 12 is flattened along a direction M transversal to the longitudinal direction L, that is to say, the body 12 is flattened substantially in a flattening plane substantially parallel to the direction L, meaning that the direction M is the direction perpendicular to L included in the flattening plan The body 12 has the form of a shaped rod.

Preferably, the body 12 is shaped in such a way that the first end 12a and the second end 12b are offset along a direction N, transversal to the longitudinal direction L. Preferably, the direction N is perpendicular to the direction M along which the body 12 is flattened (that is, the direction N is perpendicular to the flattening plane).

Preferably, the body 12 is shaped in such a way as to define a double curvature (or example, an inflection.

In the example illustrated, the body 12 comprises:
- a first stretch, proximal to the first end 12a, located along the longitudinal direction L (of principal extension of the body 12);
- a second stretch, proximal to the second end 12b, located along the longitudinal direction L;
- a third stretch, intermediate between the first stretch and the second and joining these stretches, and inclined at an angle to the first and second stretches (that is, to the longitudinal direction L).

Preferably, therefore, the first and second stretches are substantially parallel.

Preferably, the angle of inclination of the third stretch of the body 12 relative to the first stretch is between 15 and 45 degrees and, more preferably, is approximately 30 degrees.

Figure 3:
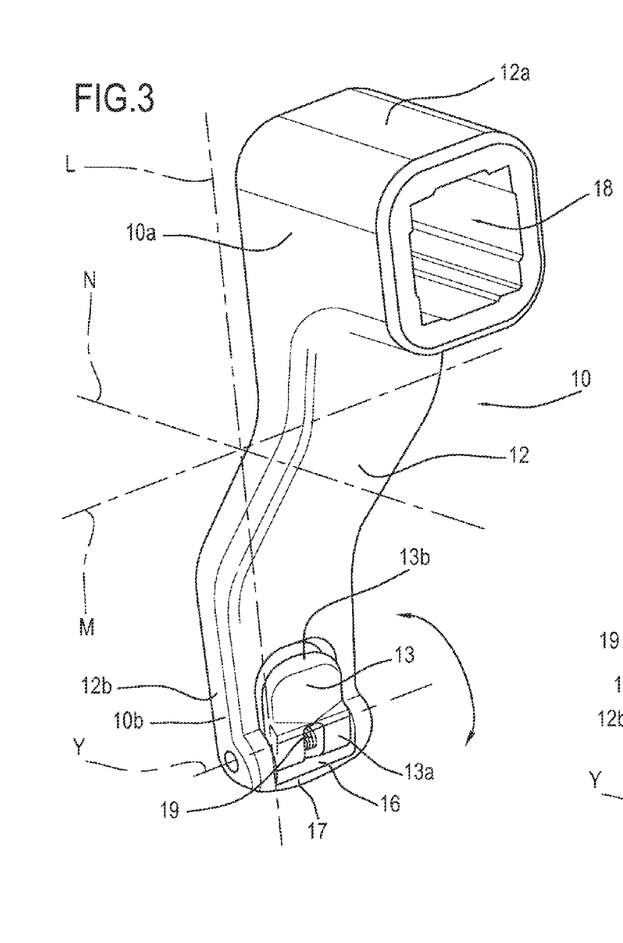
FIG. 3 illustrates the tool of FIG. 2 in a second operating configuration.

According to the invention, the removal tool 10 has a fingernail shaped member 13 which is movable between a first operating configuration, where it projects in cantilever fashion from the body 12 to define a hooked shape of the tool 10, and a second operating configuration, where it is tucked in a lateral zone of the body 12, to give the tool 10 a hookless shape, that is to say, a substantially tapered shape.

The fingernail shaped member 13 is connected to the second end 12b of the body 12, to define a hook shaped end portion of the tool 10, adapted to seize (grasp) and move (extract from the rim 6) a portion of a bead 14 of the tyre 7.

The fingernail shaped member 13 is connected to a face which is flattened (along the axis M) of the body 12 of the tool 10.

In light of this, it should be noted that the second end 12b of the body 12 has two flattened opposite faces. Of these faces, one is an inside face facing in a direction towards the first end 12a of the body 12 (which, as mentioned above, is offset relative to the second end 12b along a direction N), and one is an outside face facing in a direction away from the first end 12a of the body 12

Preferably, the fingernail shaped member 13 is connected to the first flattened face of the body 12 of the tool 10.

Preferably, in the second operating configuration, the fingernail shaped member 13 is placed against the tool body 12.

Preferably, the fingernail shaped member 13 has a width (that is an extension along the direction M) which is less than a width of the body 12 in a zone of the body 12 (consisting of the second end 12b of the body 12, that is, consisting of the second stretch of the body 12 against which the fingernail shaped member 13 is placed when in the second operating configuration.

Preferably, the body 12 defines a cavity 15 for receiving at least part of the fingernail shaped member 13, when the fingernail shaped member 13 is in the second operating configuration The cavity is formed in the aforementioned zone of the body 12 (consisting of the second end 12b of the body 12, that is consisting of the second stretch of the body 12).

That zone of the body 12 (where the cavity 15 is formed) is located on the first flattened face of the body 12 of the tool 10.

Preferably, the fingernail shaped member 13 is pivoted to the body 12 to rotate about an axis of rotation Y.

The axis Y about which the fingernail shaped member 13 rotates relative to the body 12 is perpendicular to the longitudinal axis L along which the elongate body 12 extends.

More specifically, the axis about which the fingernail shaped member 13 rotates relative to the body 12 is parallel to the direction M. that is, it is included in the flattening plane of the body 12.

The fingernail shaped member has a first end 13a, hinged to the body 12, and a free second end 13b.

Preferably, the fingernail shaped member 13 is pivoted to the body 12 at a portion (of the body 12) distal from the first end 12a of the body 12. On the other hand, the free end 13b of the fingernail shaped member 13 is relatively closer to the first end 12a of the body 12 than the first end 13a which is hinged to the body 12, when the fingernail shaped member 13 is in the second operating configuration.

Preferably, the tool body 12 comprises a contact surface 16 against which the fingernail shaped member 13 abuts when it is in the first operating configuration.

The contact surface 16 defines a mechanical constraint which prevents movement of the fingernail shaped member 13 away from the first end 10a of the tool 10.

Preferably, the contact surface 16 is defined by an end wall 17 of the tool body 12, located on the tip of the second end 12b of the tool body 12.

The end wall 17 is substantially transversal to the longitudinal direction L of extension of the body 12.

The first end 12a of the tool body 12 defines a socket 18 for coupling to the arm 3.

The tyre removing machine 1 comprises movement means for moving the fingernail shaped member 13 from the first operating configuration to the second and/or vice versa.

Preferably, the removal tool 10 comprises movement means for moving the fingernail shaped member 13 from the first operating configuration to the second and/or vice versa.

These movement means preferably comprise a biasing element (for example, an elastic, or magnetic, element) designed to force the fingernail shaped member 13 to move to the first operating configuration or to the second operating configuration.

Preferably, the movement means comprise a spring 19 interposed between the fingernail shaped member 13 and the tool body 12.

In the example of FIG. 2, the spring 19 is configured to keep the fingernail shaped member 13 in the first operating configuration when no external forces are applied to the fingernail shaped member 13. In the example of FIG. 3, the spring 19 is configured to keep the fingernail shaped member 13 in the second operating configuration when no external forces are applied to the fingernail shaped member 13.

The movement means might also (in variant embodiments not illustrated) comprise an actuator (pneumatic or electromechanical).

The tool 10 might also (in variant embodiments not illustrated) be made at least partly of a smart material, such as a shape memory material hi light of this, this material is configured to allow the tool 10 to be deformed from a first operating configuration, where it has a hooked shape, to a second operating configuration, where it has a tapered (hookless) shape Thus, generally speaking, the tool 10 is reversibly (and preferably automatically) deformable from the first operating configuration, where it has a hooked shape, to the second operating configuration, where it has a tapered (hookless) shape.

In light of this, the first operating configuration of the tool 10 corresponds to the tool 10 with the fingernail shaped member 13 in the first operating configuration, whilst the second operating configuration of the tool 10 corresponds to the tool 10 with the fingernail shaped member 13 in the second operating configuration.

Operatively, the fingernail shaped member 13 (that is, the hook shaped portion of the tool 10) faces in a radial direction opposite to the axis X of the wheel 5.

Figure 9:
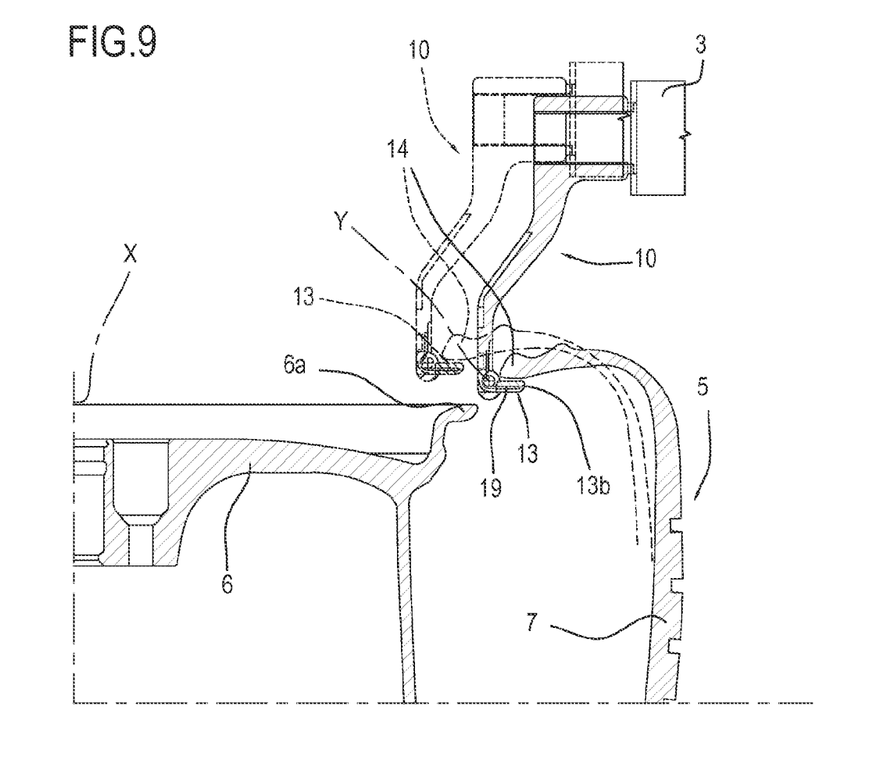
FIG. 9 illustrates the tool of FIG. 4 in a step of advanced extraction.

The removal tool 10 might also be rigidly connected to the arm 3 (an example of this solution is illustrated in FIG. 9).

Figure 10:
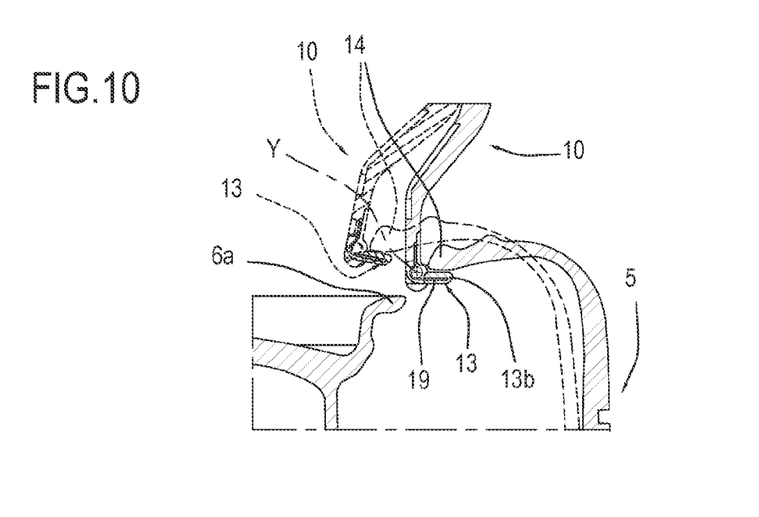
FIG. 10 illustrates the detail of FIG. 9, according to a variant embodiment.
Figure 11:
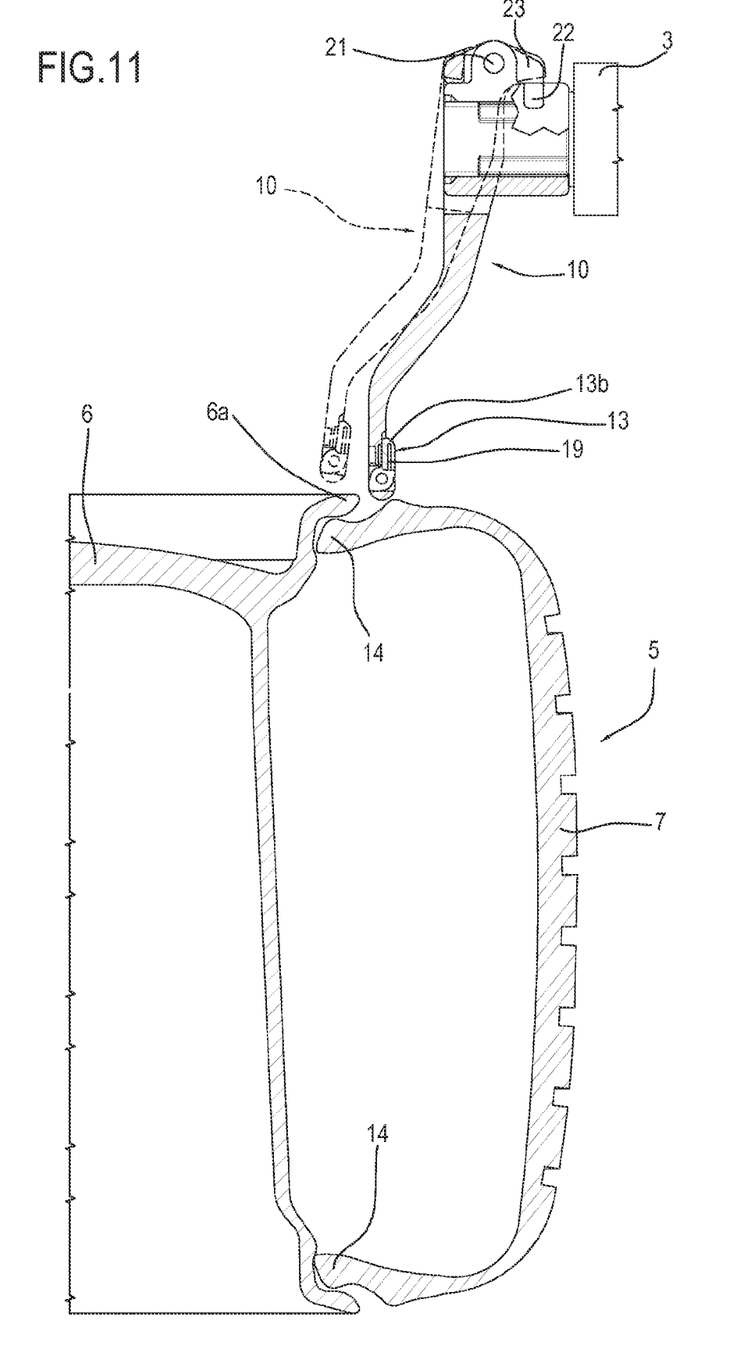
FIG. 11 illustrates the detail of FIG. 10, in an enlarged view and with the tool in a different position relative to the tyre.
Figure 12:
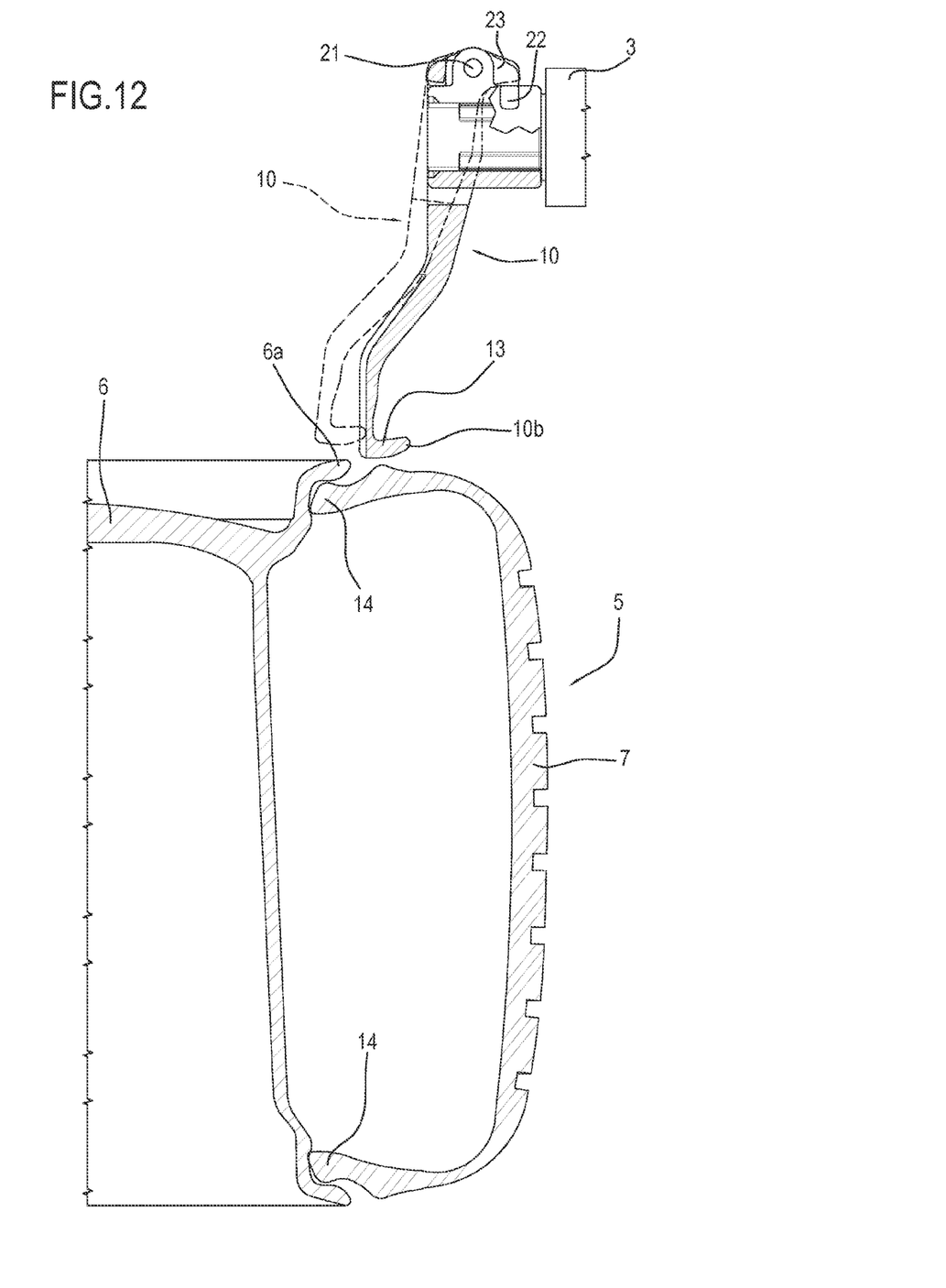
FIG. 12 illustrates the detail of FIG. 11, where the removal tool is not deformable.

Preferably, the removal tool 10 is rotatably connected to the arm 3 (an example of this solution is illustrated in FIGS. 10-12).

It should be noted that each of these two methods of connecting the tool 10 to the arm 3 is compatible with all the other features described for this invention.

It should be noted that the assembly made up of the arm 3 and the removal tool 10 connected thereto constitutes a removal device 20 (for the tyre removing machine 1, connectable to the frame 2 of the tyre removing machine 1 itself).

Preferably, the removal tool 10 is hinged to the arm 3 at a single hinge point.

Preferably, this hinge point (between the removal tool 10 and the arm 3) is fixed relative to the arm 3.

The kinematic connection between the removal tool 10 and the arm 3 (that is, the hinge) is configured to allow the tool 10 to osculate between a first operating position arid a second operating position.

Preferably, the tyre removing machine 1 (that is, the removal device 20) comprises biasing means acting on the tool 10 to force it to move to the first operating position when no external forces are applied to the tool 10.

Thus, the biasing means are means for moving the removal tool 10 relative to the arm 3.

More specifically, the biasing means comprise a spring (or, alternatively, a magnet or similar means).

In the example illustrated, the tool 10 is pivoted to the arm 3 at a pivot point 21.

The biasing means in the example illustrated, comprise a presser element 22 (pusher) operating on a protrusion 23 of the tool 10 located (at the first end 10*a* of the tool) in such a way that the pivot 21 is interposed between the protrusion 23 and the second end 10*b* of the tool 10.

The pusher 22 (for example, a spring which works by compression) applies a force in a direction away from the second end 10*b* of the tool 10.

Preferably, the arm 3 is movable relative to the machine frame 2 to move along a direction parallel to the axis X of the wheel 5, which is mounted on the rotary support 4, and in a plane perpendicular to that direction (by translation, rotation or roto-translation in the selfsame plane).

Operatively, the tyre removing machine 1 according to the invention works as described below.

First the wheel 5 is mounted on the rotary support 4.

Figure 4:
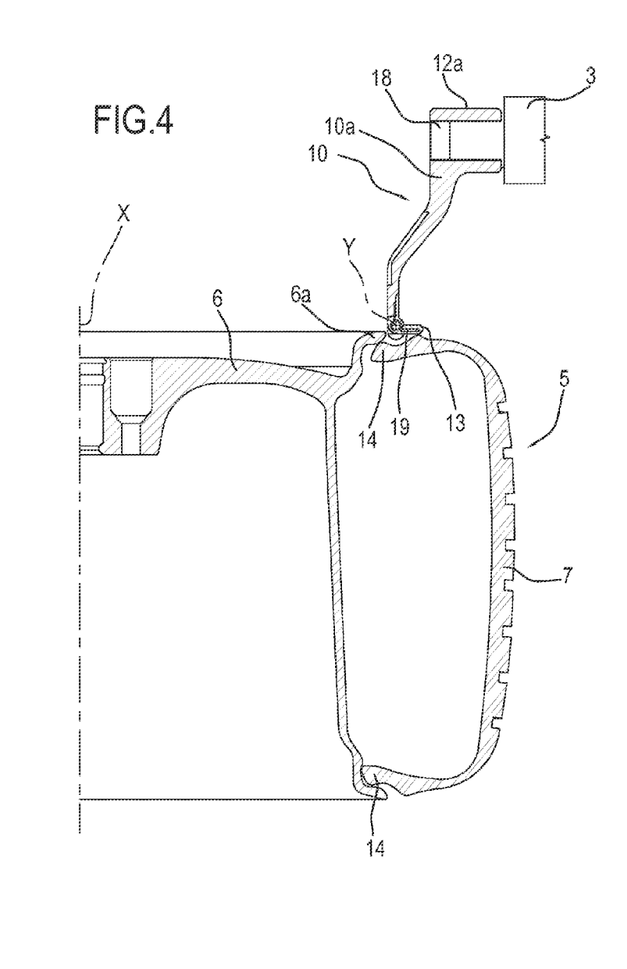
FIG. 4 is a cross section of the tool of FIG. 2 interacting with a wheel, in a preliminary positioning step.

In a preliminary positioning step, the arm 3 is moved until the removal tool 10 is positioned near the tyre 7 of the wheel 5, at a zone bordering on the edge 6*a* of the rim 6 of the wheel 5 (for example at a distance of 1 or 2 centimeters from the edge 6*a* of the rim 6, measured radially).

Figure 5:
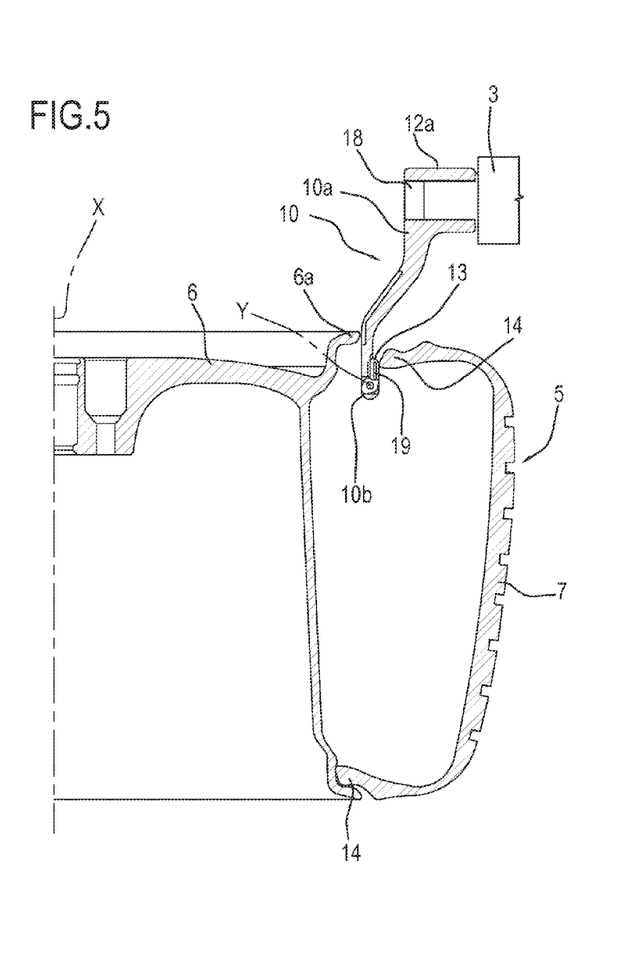
FIG. 5 illustrates the tool of FIG. 4 in a step of insertion.

The tool is then inserted between the edge 6*a* of the rim 6 arid the bead 14 of the tyre 7.

In the step of insertion, the tool 10 is kept in the first operating position (where it is parallel to the axis X of the wheel or inclined at an angle towards the inside of the rim 6.

The step of insertion comprises moving the tool 10 (by moving the arm 3) towards the wheel 5.

This movement preferably occurs along a direction parallel to the axis of the wheel.

Figure 6:
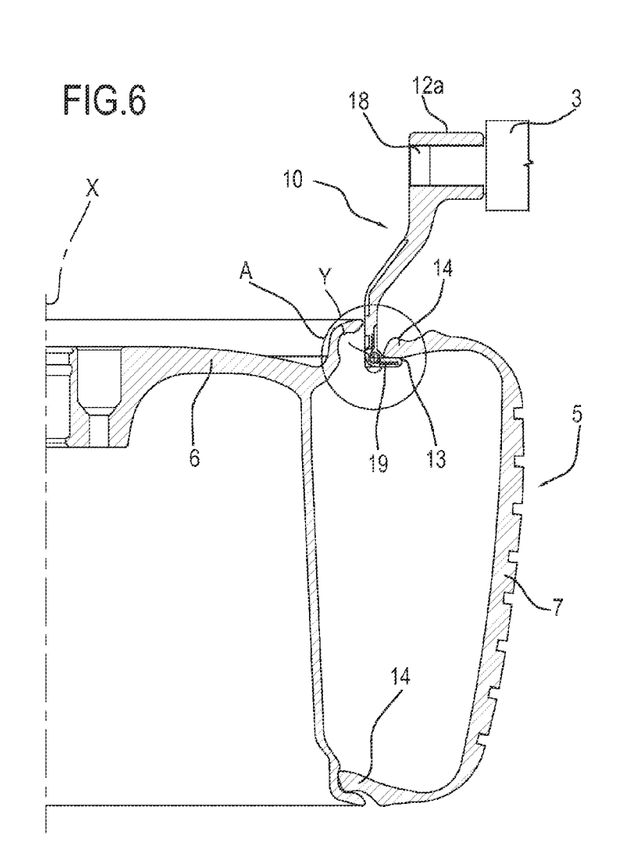
FIG. 6 illustrates the tool of FIG. 4 in a step of grasping the bead.

Next, the tool 10 (that is, the arm 3) is moved away from the wheel 5 (that is, away from the bead 14 opposite the bead which is interacting with the removal tool 10).

This movement, too, preferably occurs along a direction parallel to the axis of the wheel.

During this movement, when the second end 10*b* of the tool comes into contact with the bead 14, the fingernail shaped member 13 is positioned in the first operating configuration.

During the step of insertion, on the other hand, the fingernail shaped member 13 is positioned in the second operating configuration.

Preferably, the passage from the first operating configuration to the second is automatic.

The passage occurs after the tool 10 has moved towards the wheel 5 during the step of insertion, if the first operating configuration is the only stable configuration (in the absence of external forces). The passage occurs when the tool 10 starts moving away from the wheel 5 during the interaction with the bead 14 of the tyre 7 if the second operating configuration is the only stable configuration (in the absence of external forces).

The interaction of the tool 10 with the bead 14 of the tyre 7 during the movement of the tool 10 away from the wheel 5 causes the bead 14 to be grasped by the second end 10*b* (hook shaped) of the tool 10.

Figure 7:
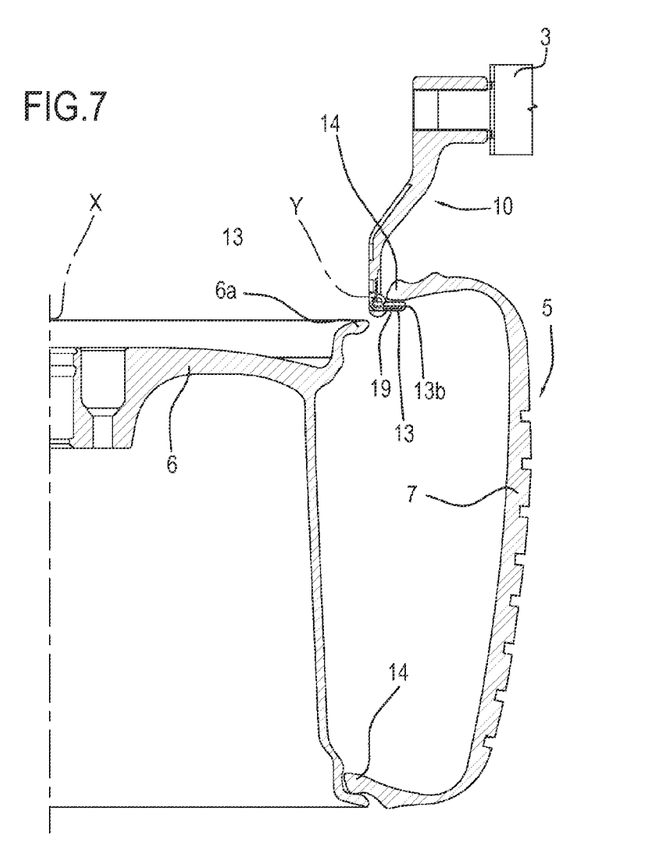
FIG. 7 illustrates the tool of FIG. 4 in a step of extraction.
Figure 8:
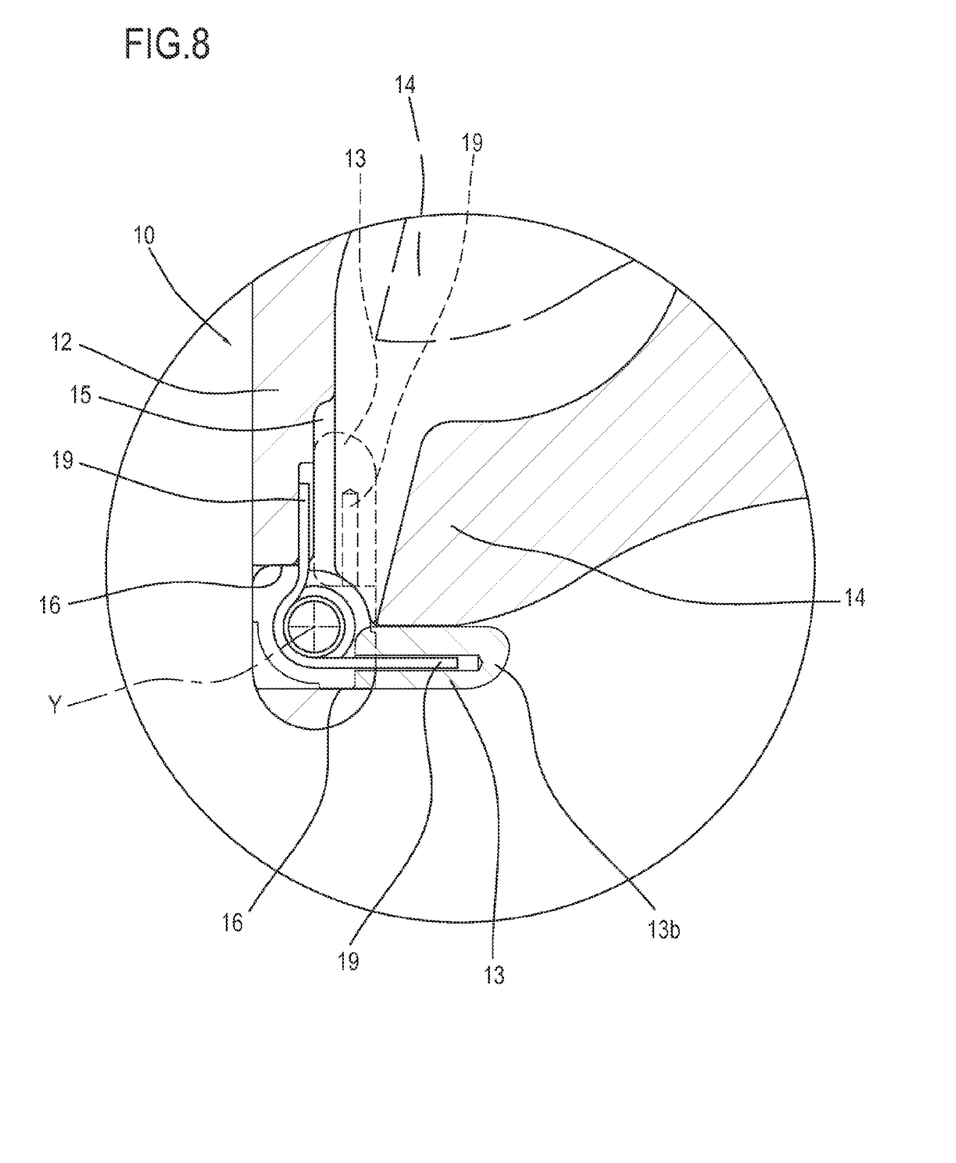
FIG. 8 illustrates an enlargement of the detail labelled A in FIG. 6.

After that, the tool 10 continues to move away from the wheel 5, whilst a portion of the bead 14 is grasped by the second end 10*b* (hook shaped) of the tool 10, until that portion of the bead 14 is in an extracted position, that is, outside the rim 6, over the edge 6*a* of the rim 6.

In this extracted position, the tool 10 moves automatically to a position close to the axis X of the rim.

In light of this, the tool 10 preferably moves automatically to a position where it is inclined at an angle towards the outside of the rim 6 and, preferably, the arm 3 (that is, the first end 10*a* of the tool 10) moves towards the axis of rotation X of the wheel 5, to contribute to relieving the bead 14 of the mechanical stress applied to it.

As regards the position of the tool 10 close to the wheel axis X (in order to relieve the stress from the bead which has been grasped and extracted from the rim), it should be noted that in the variant embodiment where the removal tool 10 is rigidly connected to the arm 3 (as in the example illustrated in FIG. 9), the tool 10 has a single operating position relative to the arm 3 (preferably the tool is positioned parallel to the axis X of the wheel 5, that is, of the rim 6).

Also, In light of this, it should be noted that during removal (in particular, in the steps of insertion and extraction) the tool 10 might be moved by moving the tool 10 relative to the arm 3 without (necessarily) moving the arm 3. In this case, the movement of the tool 10 and of the arm 3 is accomplished as described in patent document EP1593533, in the name of the same Applicant as this invention and incorporated herein by reference.

After extracting the bead 14 (and positioning it in the position where it is close to the axis) X of the wheel 5), the rotary support 4 is operated in order to set the wheel 5 in rotation about its axis X, until the bead 14 grasped by the tool 10 is extracted completely from the rim 6.

What is claimed is:

1. A removal tool (10) for a tyre removing machine (1), for taking off a tyre (7) from a respective wheel rim (6), comprising an elongate body (12) and having a first end (10*a*) which is connectable to a supporting arm (3) and a second, hook-shaped end (10*b*) for grasping a bead (14) of the tyre (7), wherein the second end (10*b*) of the tool (10) has a fingernail (13) which is movable between a first operating configuration, where it projects in cantilever fashion from the tool body (12) to define the hooked shape, and a second operating configuration, where it is tucked in a lateral zone of the tool body (12), to give the tool (10) a hookless shape.

2. The removal tool (10) according to claim 1, wherein the fingernail (13), when it is in the second operating configuration, is placed against the tool body (12).

3. The removal tool (10) according to claim 2, wherein the fingernail (13) has a width which is less than that of a zone of the body (12) against which it is placed when it is in the second operating configuration.

4. The removal tool (10) according to claim 2, wherein the tool body (12) defines a cavity for receiving at least part of the fingernail (13) when the latter is in the second operating configuration.

5. The removal tool (10) according to claim 1, comprising movement means for moving the fingernail (13) from the first operating configuration to the second and/or vice versa.

6. The removal tool (10) according to claim 5, wherein the movement means comprise an elastic element (19).

7. The removal tool (10) according to claim 1, wherein the fingernail (13) is pivoted to the tool body (12) to rotate about an axis of rotation (Y).

8. The removal tool (10) according to claim 7, wherein the fingernail (13) is pivoted to the tool body (12) at a portion of the tool body (12) which is proximal to the second end (12b) thereof, the free end of the fingernail (13) being at a position which is distal from the second end (12b) of the body tool (12) when the fingernail (13) is in the second operating configuration.

9. The removal tool (10) according to claim 1, wherein the tool body (12) comprises a contact surface (16) against which the fingernail (13) abuts when it is in the first operating configuration, defining a mechanical constraint which prevents movement of the fingernail (13) away from the first end (10a) of the tool (10).

10. A tyre removing machine (1) comprising:
a rotary support (4) for a wheel (5);
an arm (3) having a first end (3a) which is movably connected to a frame (2);
a removal tool (10) connected to a second end (3b) of the arm (3), wherein the removal tool (10) is a removal tool (10) according to claim 1.

11. The tyre removing machine (1) according to claim 10, wherein the removal tool (10) is rotatably connected to the arm (3) at a single hinge point which is fixed relative to the arm (3), so as to oscillate between a first operating position and a second operating position, and comprising elastic biasing means (22) operating on the tool (10) in such a way as to force it to move to the first operating position when there are no external forces applied to the tool (10).

12. A method for removing a tyre (7) from a corresponding rim (6) of a wheel (5), using a tyre removing machine (1) equipped with a rotary support (4) for the wheel (5), an arm (3) having a first end (3a) which is movably connected to a frame (2), and a removal tool (10) having a first end (10a) which is connected to a second end (3b) of the arm (3), the method comprising the following steps:
inserting at least a second end (10b) of the tool (10) between an edge (6a) of the rim (6) and a bead (14) of the tyre (7);
extracting the bead (14) of the tyre (7) from the rim (6);
rotating the rim (6) about its axis (X) while keeping the arm (3) in a position where the bead (14) of the tyre (7) is extracted from the rim (6), wherein between the step of insertion and the step of extraction, the second end (10b) of the tool (10) is deformed from a second operating configuration, where it is tapered, to a first operating configuration, where it is hook shaped.

13. The method according to claim 12, wherein the deformation of the second end (10b) of the removal tool (10) from the second operating configuration to the first occurs automatically by interaction between the tool (10) and the bead (14) of the tyre (7) in the step of insertion or in the step of extraction.

14. The method according to claim 12, wherein the removal tool (10) comprises an elongate body (12), having a first end (12a) and a second end (12b) corresponding to the first end (10a) and the second end (10b) of the tool (10), and a fingernail (13) pivoted to the second end (12b) of the body (12), in such a way as to be movable between a first operating configuration, where it projects in cantilever fashion from the tool body (12) to define the hooked shape, and a second operating configuration, where it is folded onto the body (12), to give the body (12) its hookless shape.

15. The method according to claim 12, wherein the removal tool (10) is hinged to the arm (3) to oscillate relative to it between a first operating position, where the step of insertion is in progress, and a second operating position, where the step of extraction is in progress, and wherein the tool (10) is kept in the first operating position by biasing means (22), and wherein the movement of the tool (10) from the first operating position to the second occurs automatically by effect of a force applied to the tool (10) by the tyre (7) bead (14) in the extracted position.

* * * * *